United States Patent [19]
Chisholm

[11] 3,950,753
[45] Apr. 13, 1976

[54] STEPPED CARDIOID BEARING SYSTEM

[76] Inventor: John P. Chisholm, 16 Joy st., Boston, Mass. 02114

[22] Filed: Dec. 13, 1973

[21] Appl. No.: 424,458

[52] U.S. Cl. .............................. 343/106 R; 343/118
[51] Int. Cl.² ..................................... G01S 1/56
[58] Field of Search ..................... 343/106 R, 118

[56] References Cited
UNITED STATES PATENTS

| | | | |
|---|---|---|---|
| 3,195,133 | 7/1965 | Shames | 343/118 X |
| 3,560,978 | 2/1971 | Himmel et al. | 343/106 R |
| 3,790,942 | 2/1974 | Becavin et al. | 343/106 R |

Primary Examiner—Maynard R. Wilbur
Assistant Examiner—Richard E. Berger
Attorney, Agent, or Firm—Dowell & Dowell

[57] ABSTRACT

An antenna system having a central radiator element and one or more surrounding rings of parasitic elements which can be tuned or actuated separately in each ring by electrical commutation to provide a stepped cardioid radiation or receiving pattern. When the radiator element and a ring of parasitics are used to transmit a cardioid, its stepped pattern contains a fundamental sinusoidal component which can be extracted by a filter at a receiver and used to provide a TACAN/VORTAC bearing determination by comparing its phase with a reference signal transmitted once per revolution of the pattern to mark a predetermined position in its rotation, as is common in TACAN systems. When the cardioid pattern comprises transmitted squitter pulses, care is taken to ensure actual transmissions marking each stepping of the antenna pattern in order to provide optimum bearing information.

11 Claims, 10 Drawing Figures

STEPPED CARDIOID BEARING SYSTEM

FIELD OF THE INVENTION

This invention relates to improvements in rotating cardioid antenna systems for use in measuring bearings, and especially for use between a unit transmitting a rotating antenna pattern together with a reference marker signal as the pattern passes a predetermined orientation and one or more receiving units each having signal processing means for determining the phase displacement between the received reference marker signal and fundamental sinusoidal component of the rotating cardioid at that receiving location. Moreover, the invention is also useful as a rotating cardioid antenna for receiving systems, useful for determining the bearing of a transmitter sending out the signals being received by an antenna of the type disclosed herein.

PRIOR ART

Mechanically revolving a cardioid antenna is the usual and obvious way of producing a rotating signal pattern in space that can be used in the measurement of bearing with respect to the antenna location. The Tacan navigational system is one class of system that utilizes this technique, and since the present invention has especial utility in this field, the invention will primarily be discussed with respect to Tacan or Vortac, although the invention is not limited to use in that type of system. Another known way of providing a rotating cardioid pattern in a TACAN-type system includes the mechanical rotation or a parasitic element about an omnidirectional radiator. Still another generally known approach is to use an electronically controlled stationary array of parasitic elements about the radiator. A prime example of the latter type of electronically controlled array is shown in Himmel et al, U.S. Pat. No. 3,560,978 which produces a rotating cardioid pattern useful for purposes analagous to the present invention and including a central omnidirectional driven radiator surrounded by several annular rings of parasitic elements which are commutated electronically to provide 15 Hz cardioid modulation and the auxiliary 135 Hz cardioid modulation for use at TACAN type beacon stations. The patent teaches the use of a large number of parasitic elements in each annular ring and a high commutation rate so that the radiated pattern actually simulates the mechanically rotated patterns referred to above, which mechanical systems are in general use in TACAN/VORTAC stations at the present time.

The present invention produces stepped cardioid pattern and is based upon the realization that theoretically a sine wave of known frequency can be defined by more than two spaced amplitude samplings, and that as a practical matter three or more samplings define it quite well. This technique is now well established and is often referred to as the "Sampled Data Theorem". A discussion thereof appears in the Proceedings of the I.R.E., Vol. 39, No. 1, Jan. 1951 in an article by Chisholm and Buckley entitled "A Multichannel PAM-FM Radio Telemetering System" at page 37, and there are many other articles which have been published to discuss this Theorem. The present disclosure teaches the concept of simplifying the antenna system and electronics of the prior art such as shown in U.S. Pat. No. 3,560,978 supra, by omitting from each of the rings of parasitic elements all but a very few of the parasitic elements. If this is done the pattern produced does not so closely resemble a continuously rotating cardioid producing sine wave envelope in space, but instead comprises a periodically stepped cardioid producing an envelope modulation pattern representing time-spaced samplings of a sinusoid which can be received and processed at a remote location to recover a sinusoidal fundamental. This stepped envelope is processed in the filter system of an ordinary TACAN/VORTAC receiver to extract the fundamental sinusoidal component, which component is then used in a bearing measurement made by some well known technique. In a TACAN/VORTAC system the bearing measurement relies upon measuring the phase of the received sinusoidal modulation with respect to a transmitted pulse reference burst, and in some systems only the 15 Hz modulation is used for this purpose while 135 Hz modulation is ignored. In the case of a 15 Hz only Tacan system this phase measurement is made by comparing the phase of the received 15 Hz sinusoidal component with the Main Reference Burst which is always transmitted when the peak of the fundamental 15 Hz component of the rotating pattern passes a predetermined orientation-nominally East at which time the zero-axis crossing of the sinusoidal is North oriented. Other systems use both the 15 Hz and the 135 Hz modulation components, and in the case of a 15/35 Hz Tacan system the phase measurement is made both with respect to the 15 Hz component and the Main Reference Burst and also with respect to the 135 Hz modulation and the 135 Hz Auxiliary Reference Bursts.

Confining the discussion initially to the case of a system employing only 15 Hz modulation, and reversing the 135 Hz system for later discussion, the 15 Hz pattern that is actually radiated is a stepped cardioid whose levels may be thought of as approximating a sinusoid, or more accurately as representing times-paced samplings of a sinusoid. It is important to realize that there is a phase delay between the moment when the pattern is stepped at the antenna array and the resulting fundamental sinusoidal component of the pattern which will be extracted from the incoming signal at the receiver, and further that as a result of this inherent delay it is necessary that the Main Reference Burst be transmitted at a compensated time, that is, at the time when the 15 Hz fundamental sinusoidal component crosses the zero axis in the increasing direction of the waveform of the sinusoid, as viewed North of the array. The sampled Data Theorem shows that the phase of the recovered sinusoidal component at the receiver actually lags the stepped cardioid that produces it by a delay equal to one half the number of electrical degrees between successively comutated parasitic elements serving to step the cardioid. Thus, for a three parasitic element antenna system the lag would be $(360/3 \times 2) = 60°$. For a four parasitic element system the lag would be 45°, for a six element system the lag would be 30°, and so on. In a practical operating system the number of parasitic elements in any ring is known and fixed and, therefore, the lag is known and constant. As a result it is possible to compensate this inherent lag out of a bearing system by delaying transmission of each Reference Marker Burst signal to delay the burst by the number of electrical degrees of the abovementioned lag, so that the Reference Marker signal occurs the same number of degrees later than the time when the transmitted cardioid is stepped into the same directional orientation. The relative phase between the Reference Burst signal and the extracted fundamental sinusoidal component of the rotating cardioid pattern as measured at a remote receiving unit is thus made free of this error, as will be discussed below more fully.

It is therefore a major object of this invention to provide a bearing system wherein the antenna system is simplified and reduced in size, weight, complexity, and cost, but wherein the phase delay resulting from the simplification is compensated out of the system at the stepped cardioid antenna.

In bearing systems of this stepped cardioid type the radiating element of the antenna can be driven either with pulses, i.e. cardioid-modulated squitter as in Tacan, or else driven with continuous wave which is cardioid sampled or modulated by the commutation of the parasitic elements. Therefore, the received signal at a remote receiver either comprises a stepped series of squitter pulses whose heights change every time a new parasitic element is enabled, or else it comprises a CW stepped envelope wherein the amplitude of the envelope changes with each commutation and remains constant between commutations.

In the case where the signal is pulsed, i.e. squittered, and especially in the Tacan system wherein about 180 pulse pairs are transmitted during each revolution of the 15 Hz pattern, there is also a similar delay due to the "Sampled" nature of the transmission, amounting in the case of normal Tacan to $(360/180 \times 2) = 1°$. This one-degree delay is associated in a Tacan with the squitter pulsed nature of the transmission, and in no way is associated with the antenna system. In addition to this delay there is a noise "jitter" due to the random timing of the squitter. However, in the design of the antenna system described herein this delay and noise due to the pulsed nature of the transmitted signal will be eliminated by having a transmission occur at the precise moment when each parasitic element is actuated.

In addition to eliminating the phase delay due to the pulsed nature of the nominal 2,700 pulse pairs transmitted per second and forming the Tacan signal, the technique of always transmitting a pulse each time a parasitic is newly actuated also permits a great reduction in the number of pulse pairs that must be transmitted to keep "jitter noise" down. For example, in a system using 15 Hz only, the number of transmissions were reduced to 135 Hz pulses pairs per second, or nine per cycle for a nine element array, without introducing any additional noise due to the pulsed nature of the signal since the pulses occurred precisely when the parasitics were actuated. There was, of course, the constant 20° lag inherent in the use of nine parasitic elements as discussed above, which lag was compensated out by similarly lagging the time at which the Main Reference Burst occurred.

It is therefore another major object of this invention to provide a system in which relatively few parasitic elements are commutated during each revolution of the pattern, but wherein output is always transmitted from the central radiator element of the antenna at and just after the precise instant of commutation, whether the system be pulsed or CW.

One aspect of the present system concerns a way of radiating sinusoidal information which is effectively sampled at the transmitting facility at the rate of commutation of the parasitic elements, while at the same time insuring that at the very instant of each new sampling output will actually be transmitted, taken together with means for compensating out the phase delay which in accordance with the Sampled Data Theorem becomes very apparent when a sine wave is reproduced at the filter in a receiver in response to a low sampling rate.

The above discussion has been mainly concerned with the case wherein the invention is used to replace the 15 Hz rotating cardioid transmitting antenna of a Tacan system. The invention can also be used to receive transmitted signals to determine the direction from which the signals were transmitted. Therefore, the invention teaches a basic concept that employs as few as three parasitic elements to either step-modulate a transmitted signal with a cardioid pattern so remote receivers receiving that signal can process it to obtain their bearings from the transmitter, or alternatively to step modulate a received signal of constant level as in direction finding practice so that the receiver can process the incoming signal to determine the direction from which the incoming signal emanates.

The present system has advantages including lightness of weight, simplicity with greater reliability, and reduction of cost, and these advantages make it attractive when used in certain practical applications, several examples of which are herein described in the aircraft navigation and stationkeeping fields. A first practical application lies in the provision of simpler and less expensive TACAN type ground units to be placed at small or remote airport locations, or even aboard an aircraft or ship to provide a mobile transponder bearing station. In each of these applications, the present simplified transponder unit is especially practical since it can be installed anywhere as a beacon and since it will cooperate to provide homing or bearing information to any existing airborne DME and BEARING unit without requiring any changes in the latter.

A second practical application based upon the small size and reliability of the antenna system is to place a rotating-pattern receiving antenna of the present type aboard each aircraft in a stationkeeping situation so that on a time-sharing basis the participating aircraft can determine both ranges and bearings to all the other participating aircraft, or to a leader aircraft, thereby to maintain their desired aircraft in the formation, for instance, to replace the physically rotated antennas used in a system resembling the one shown in U.S. Pat. No. 3,336,591.

A third practical application for stationkeeping or collision avoidance purposes is to combine the first and second practical applications just mentioned so as to provide an airborne TACAN type beacon station in one or more aircraft, for instance, in a time slotted system of the ATA Collision Avoidance type described in U.S. Pat. No. 3,458,861 so that participating aircraft can determine range and bearing to the beacon equipped aircraft in the case of one type of stationkeeping system, or to and between each other in another type of stationkeeping or collision avoidance system in which all participating aircraft include DME and BEARING beacon transmitting and receiving equipment of the type described in this disclosure with which to locate each other. In this third practical application it is possible to further simplify the system in order to reduce the number of transmitted signals on the air at any particular moment and thereby enable more aircraft to participate in a time sharing system, because in the prior art time sharing stationkeeping systems where narrow beam directional antennas were used to scan, i.e., as shown in U.S. Pat. No. 3,336,591, each aircraft had to transmit a large number of pulses per antenna scan in order to insure that some of them would be transmitted at a time when the directional antenna of another aircraft was facing in a receptive direction. However, if the directional narrow beam antenna is replaced by the present stepped cardioid system which is essentially receptive to pulses coming from any direction, then only a few pulses need be transmitted per scan, thereby leaving room in the time sharing cycle for greater range capability, or for more time slots and thus more participating aircraft. For instance, if a cardioid array of only three parasitics were used then for a 15 Hz cardioid rotation rate, 45 pulses per second would be adequate. Moreover, if the rotation rate of the cardioid were reduced, even to as low a rate as 1 Hz, then only three pulses per second would be required and the system could be further expanded as to the number of participating aircraft and/or maximum usable range. Of course, the cardioid antenna does not provide the gain obtainable from a directional antenna, but transmitter powers in existing equipment are still adequate reliably to achieve at least 75 miles range despite the use of omni antennas.

It should be apparent that although the main example used in the present disclosure involves a 15 Hz TACAN cardioid rotation rate other rotation rates are possible, i.e., a lower rate such as 1 Hertz as mentioned in the preceeding paragraph, or a much higher rotation rate as will now be discussed. Consider as a fourth practical application the use of the present stepped cardioid in a collision avoidance system similar to the ATA Specification CAS System, wherein the aircraft occupy unique time slots in a cycle of slots repeating every 3 seconds. Each aircraft broadcasts its position-marking pulse every three seconds and each pulse has an envelope of 200 micro-seconds duration so that range rate and range can be obtained by other aircraft receiving that pulse. Now, bearing can also be conveniently obtained by another aircraft while receiving that 200 microsecond envelope. For example, if each aircraft receives the 200 microsecond pulse via a stepped cardioid antenna using four parasitic elements, and these elements were commutated at a one-microsecond rate, this would provide a cardioid rotating at a 4 microsecond rate, or at the rate of 250 KHz. This would provide some 50 cardioid rotations during each transmitted 200 microsecond position marker pulse, i.e., much more than enough to provide bearing data for a receiving system in the aircraft. Actually, only a single rotation is enough to provide such angle according to the Sampled Data Theorem. This can be done since the rotation commutation levels could be recorded and subsequently used to produce a train of repetitive rotation data of any desired length which chain could be processed in the type of filter and phase measuring circuit used in conventional Tacans, or it could be processed in a digital computer that accomplishes the same measurement process but in a digital manner. However, bearing errors can be made to decrease with the square root of the number of actual rotations received while making measurements. Any error in the first rotation data if merely recorded and repetitionally reproduced would, of course, be repeated to the detriment of the resulting bearing measurement.

Other objects and advantages of the invention will become apparent during the following discussion of the drawings, wherein:

THE DRAWINGS

Figure 2:
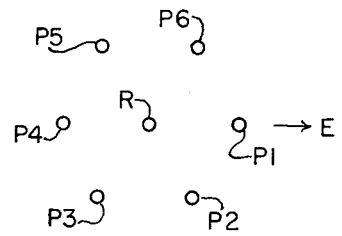
FIG. 2 is a plan view of an antenna array having a central radiator element and six surrounding parasitic elements.
Figure 3:
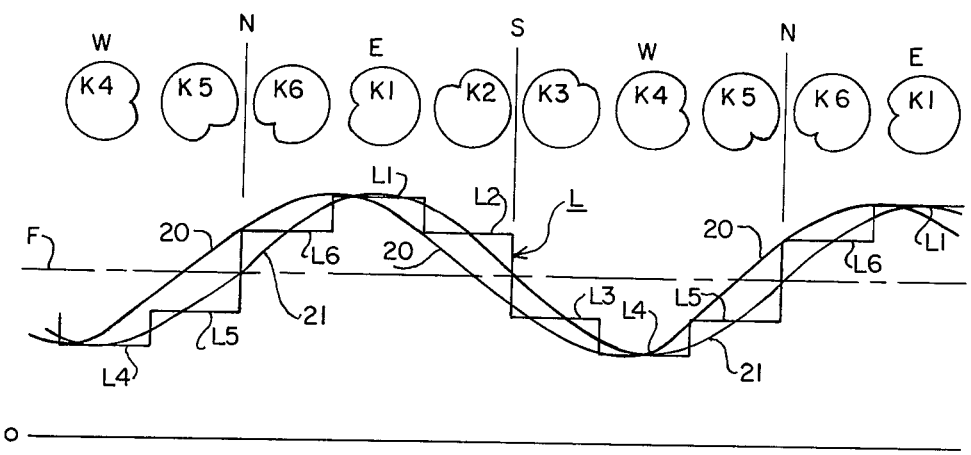
Figure 4:
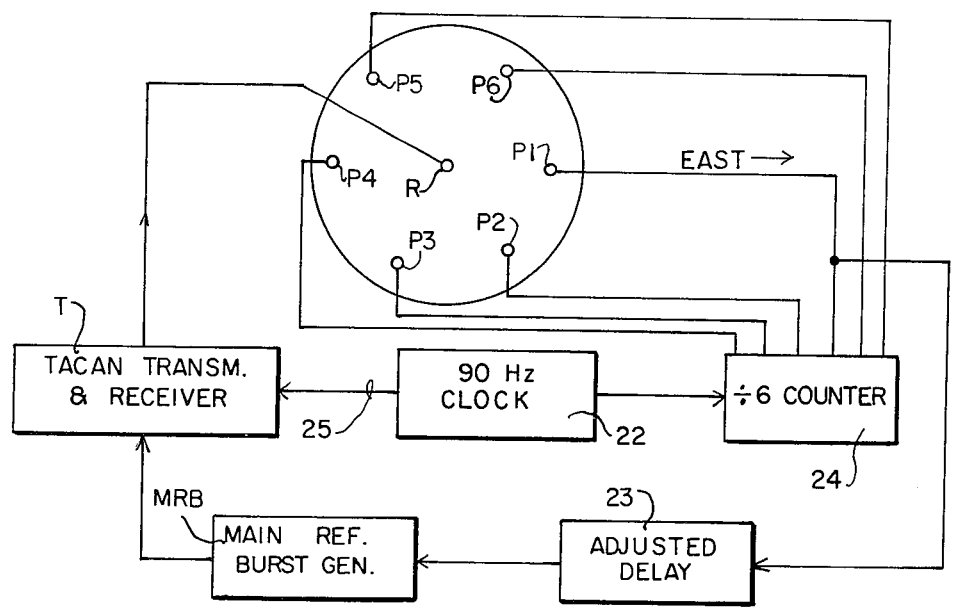
Figure 7:
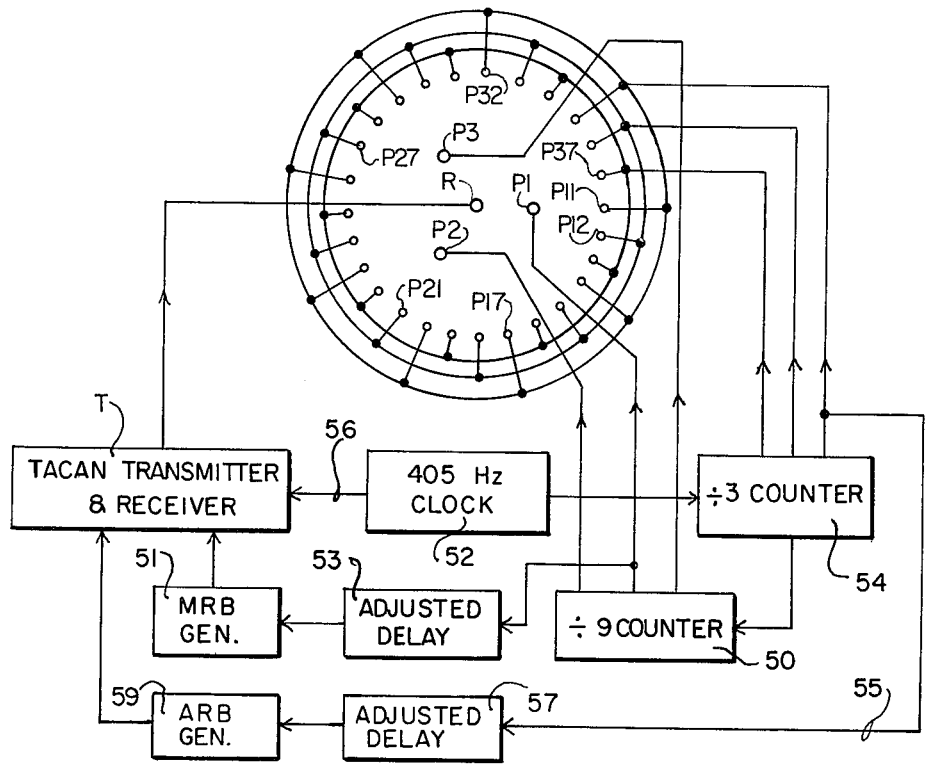
Figure 5:
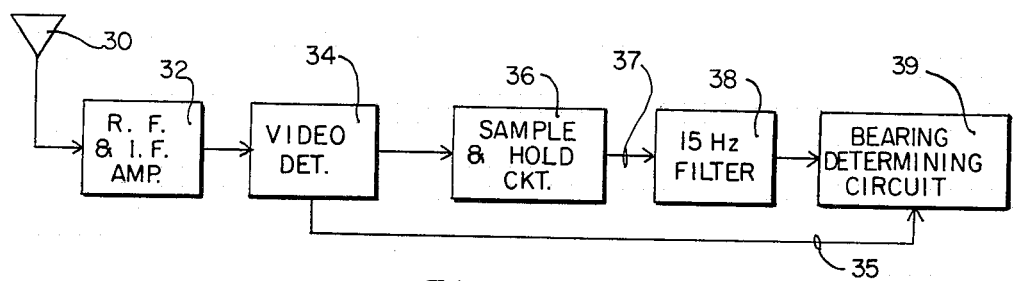
Figure 6:
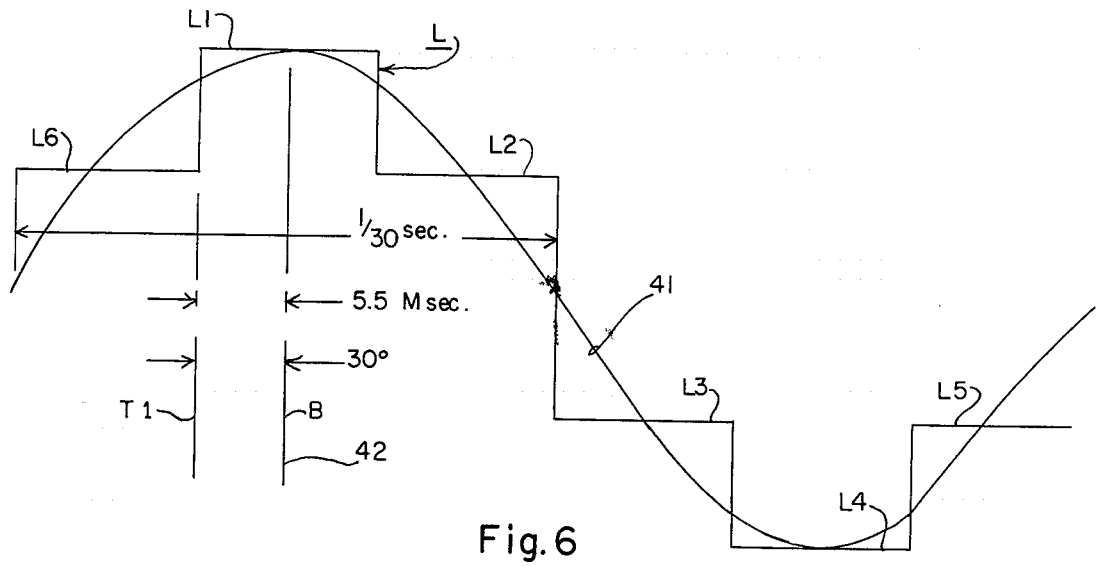
Figure 8:
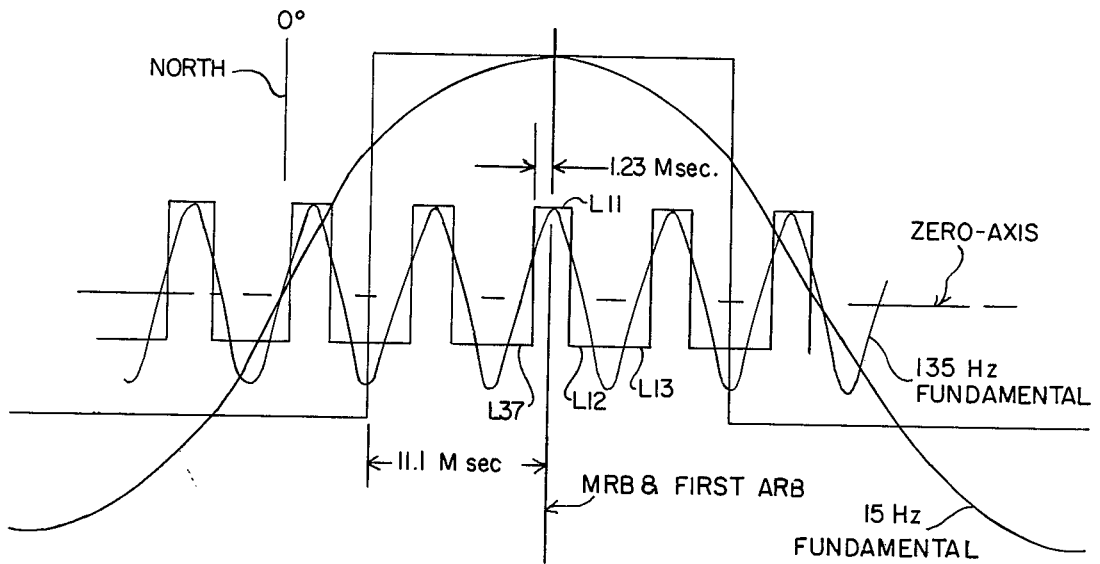
Figure 9:
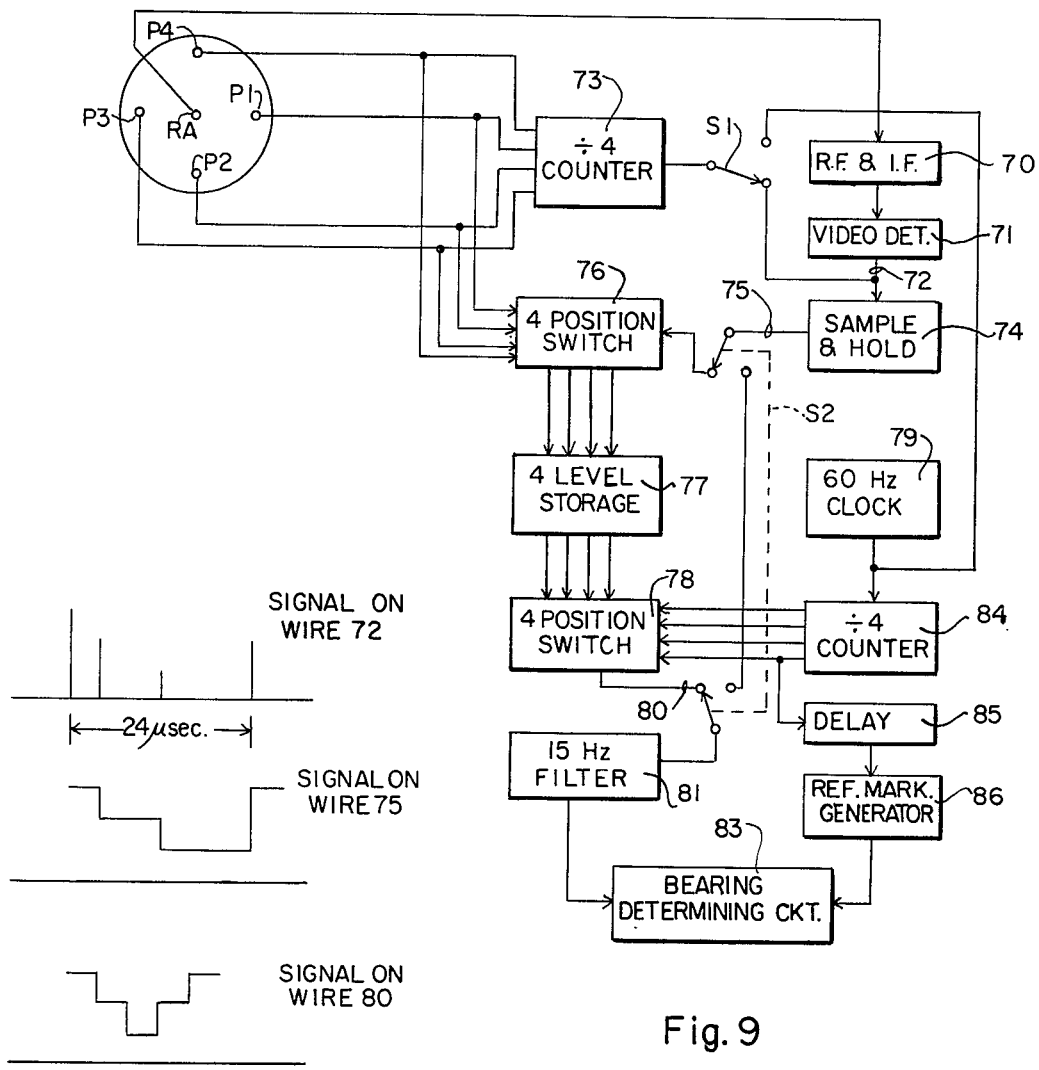
Figure 10:
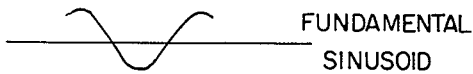

FIG. 3 is a figure showing the radiation pattern as received at a receiver East of an array as shown in FIG. 2 as its parasitic elements are commutated to rotate a cardioid as shown in the upper portion of FIG. 3. FIG. 3 also shows the sinusoidal modulation that would be produced by the continuous rotation of a single parasitic element and the fundamental sine wave component of the modulation produced by the stepped parasitic array;

FIG. 4 is a figure showing circuitry for the embodiment of FIG. 2 including control means for stepping the cardioid pattern and for generating the Main Reference Burst;

FIG. 5 is a view of an aircraft bearing receiver including typical filtering by which it reconstitutes received bearing transmissions of the TACAN/VORTAC type;

FIG. 6 is a view similar to FIG. 3, but showing the modulation signal as received at a receiver East of the array of FIG. 2 and the resulting signal when filtered in the 15 Hz filter of a typical Tacan receiver and the relationship to the timing of the Main Reference Burst;

FIG. 7 is a figure showing an embodiment similar to FIG. 4 but using different numbers of parasitic elements in two rings for producing both 135 Hz modulation and 15 Hz modulation;

FIG. 8 is a figure showing of the 15 Hz pattern the 135 Hz pattern at the moment of occurrence of the Reference Bursts for the array of FIG. 6 and showing fundamental sinusoids as processed by filtering in the 15 Hz and 135 Hz filters of a conventional Tacan receiver;

FIG. 9 is an embodiment of a direction finding receiver system used to obtain the direction of a single non-repetitive pulse group; and FIG. 10 is a diagram including four waveforms used in explaining the operation of the embodiment shown in FIG. 9.

Figure 1:
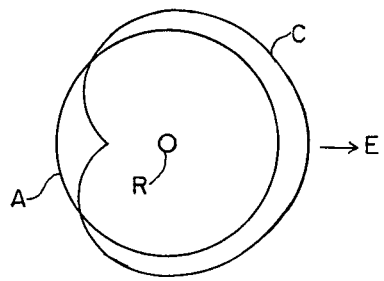
FIG. 1 is a plan view showing a vertical radiator element and a parasitic element producing a cardioid antenna pattern.

Referring now to the drawings, FIG. 1 shows the radiation pattern of an antenna comprising a radiating element R driven by a transmitter and a parasitic element located to the right of the radiator R. In the absence of the parasitic element, the radiation pattern from the radiator R as viewed from above is circular as represented by the circle A shown in FIG. 1. On the other hand, if the parasitic element is tuned and spaced properly from the radiating element R, then the radiation pattern becomes the cardioid C with the maximum of the pattern extending in the direction of the parasitic element, as is well known in the prior art.

The purpose of the present invention is to produce a cardioid antenna pattern using an active omni radiator R which pattern steps and thus appears to rotate as received at a remote receiving location. For the purpose of providing an illustrative embodiment as shown in FIG. 2, a plurality of individual parasitic elements P1, P2, P3, P4, P5 and P6 are equally spaced at 60° intervals in a ring about the central radiator R such that any parasitic element when activated will direct the radiation pattern to strengthen it in the direction of the active element. An antenna array as shown in FIG. 2 is useful as a Tacan-type rotating beacon, for instance one in which the antenna pattern or cardioid must rotate at the rate of 15 Hz.

According to the above embodiment the cardioid pattern is not intended to smoothly and continuously rotate, but is instead intended to step through six consecutive positions at a 15 Hz sinusoidal modulation rate. These six positions are as illustrated in the upper portion of FIG. 3 by the six positions of the small cardioids K1, K2, K3, K4, K5 and K6. For the purpose of illustrating a typical example of the present invention the stepped waveform in the lower portion of FIG. 3 shows the signal envelope L which would actually be received at an aircraft located due East of the antenna array. East is used as a reference direction in this discussion for the sake of convenience since the Reference Pulse is transmitted, in TACAN systems as noted below, when the peak of the pattern faces East. At the left end of the representation there is a flat portion of the pattern labelled F which represents the envelope level which would be received in the absence of any of the parasitic elements P1 through P6 being activated or tuned, for instance by grounding their lower ends. Now, as viewed East of the array if the Eastern parasitic element P1 is activated, the signal strength will immediately jump to the level L1 and will remain there until the parasitic element P1 is deactivated and the parasitic element P2 is activated, at which time the signal level will shift to the level L2 as shown in FIG. 3. Still as viewed by an aircraft directly East of the central active radiator R of the antenna pattern, if the parasitic element P3 is then activated and the element P2 deactivated, the cardioid pattern as shown in the upper portion of FIG. 3 then changes from the pattern K2 to the pattern K3 resulting in the signal level L3. As the parasitic elements continue to be switches on one at a time, the cardioid pattern which is radiated changes from K3 to K4, then to K5, then to K6, at which time it begins repeating with the cardioids K1, K2, K3, ... It does not matter in the present discussion concerning the effect of a parasitic element on an omnidirectional radiator whether the actual signal radiated from the central active radiator R comprises a CW sine wave or whether it comprises squitter pulses appearing, for instance, at a high rate as in TACAN beacon systems, wherein 180 pulse pairs are radiated from the central radiating element R during each rotation of the 15 Hz cardioid pattern. As will be further discussed hereinafter, it is however necessary that the enabling of the various parasitic elements P1 through P6 can be accomplished in commutation steps which are uniformily spaced in real time. Other embodiments are possible wherein the parasitics are not uniformly commutated or positioned, one such embodiment being discussed in connection with FIG. 9.

The above discussion has stated that the cardioid pattern is stepped rather than continuously rotated. The following discussion outlines how this stepped signal is processed in order to reconstruct the sinusoidal modulation and provide bearing information.

It is a well known technique, as described in the abovementioned I.R.E. article and extensively used in connection with the multiplexing of plural signals transmitted on a common medium where each signal contains sine wave information components no higher than frequency $f_{max}$, that it is not necessary for each signal to be continuously transmitted. Accurate and adequate representation of each wave signal can be had by sampling the envelope of each wave at equal intervals greater than $2 f_{max}$ and then transmitting pulses whose heights represent the instantaneous wave samplings, these pulses then being separated at the other end of the transmission medium according to the individual waves of which they are samples. Thereafter each group of pulses is processed in such a way as to reconstitute the original wave form.

The present invention resulted from the realization by the inventor that this sampling technique can be applied to an antenna which is transmitting a sinusoidal envelope such as utilized in TACAN. The basic difference between the present invention and the teaching of Himmel, et al, Pat. No. 3,560,978, supra, resides in the fact that the teaching in that patent shows a very large number of parasitic elements distributed around the central radiating element, which parasitics are switched by shift register means requiring a great many stages each coupled to one or more of the parasitics in order to simulate the continuous rotation of a cardioid antenna pattern. Himmel's patent does not discuss the Sampled Data Theorem and its importance with reference to the minimum number of parasitics that must be employed, and to the associated delay that must be accounted for. In contrast to the prior art the present invention is fully operative with only a very small number of parasitics, at least three as noted below, in order to generate the basic 15 Hz rotating cardioid.

While the Sampled Data Theorem states only that more than two samples per cycle are required to uniquely define a sine wave, a physical embodiment using less than three parasitic element activated during each cycle means that a much larger number of parasitic elements would actually be required since the activated parasitic elements used on successive cycles would be different. That is, the elements on successive cycles only occur in the same location around the circumference if the wave is sampled, i.e. parasitic elements commutated, in an integer manner. If, for example, 2.5 samples per cycle were utilized then the parasitics would have to be placed at 0°, 144°, 288°, 72°, 216°, etc., and sequentially enabled during several successive cycles. This would result in the need for a number of parasitics in excess of three. When three samples per cycle are utilized, parasitics placed at 0°, 120°, 240°, 0°, 120°, 240°, etc., can be used so that a total of only three parasitics are required. Although three parasitics would actually be sufficient, a somewhat larger number can be employed according to the present invention in order to make it easier for the aircraft receiver accurately to reconstitute the sine wave of the rotating antenna pattern at the same time minimizing phase shift in the reconstituted sinusoid as will be more fully discussed hereinafter.

Considering now an embodiment of a practical system useable both in air and in ground station becomes for generating the stepped pattern of FIG. 3, the block diagram of FIG. 4 illustrates an antenna embodiment associated with a transmitter and including parasitic element commutating means. A Tacan Transmitter T is connected to the central radiating element R, and suitable clock means 22 and counters 24 are provided for commutating the parasitic elements P1 – P6 inclusive so that one of them is activated at a time. Since each 15 Hz rotation of the antenna is divided into six commutations, 90 pulses per second from clock 22 will be required to drive a ÷6 counter 24 to provide a 15 Hz stepped cardioid pattern The manner of commutating the parasitic elements using diodes coupling the bottom of each parasitic element to a counterpoise can be the same as is shown in Himmel U.S. Pat. No. 3,560,978, although there are many other ways which can be used in practical equipment built according to the present invention. Such a commutating means comprises a diode (not shown) to ground from each of the parasitic elements, which diode is biased forward when an output from the counter 24 is high, only one output from the counter being high at any particular moment.

FIG. 5 shows a typical high quality airborne TACAN receiver having an antenna 30 entering an RF and IF unit 32 whose output enters a video detector 34. The output from the video detector goes to a sample and hold circuit 36 which samples each squitter pulse group as to amplitude and holds that level until another pulse group is received. These levels are then passed on to a 15 Hz tuned filter 38 and its output then goes to a bearing determining circuit 39 which also receives main reference burst pulse groups from the video detector on wire 35. The receiver as shown in FIG. 5 is of course an off-the-shelf purchased item which includes standard pulse pair decoders and other phase comparing circuitry which is necessary to make it operate for the purpose of determining the bearing to the transmitting beacon array. This receiver for instance exists in the airborne TACAN equipment manufactured and sold by the Sierra Research Corporation as their Model 7000 DME and Bearing Unit. This very receiver, completely unaltered, operates very well with the antenna array as shown in the present drawings, and produces at the output of the filter 38 reconstituted 15 Hz sine waves representing the antenna cardioid rotation to provide accurate bearing indications, assuming that compensation for the position of the main reference burst is made in the transmitting equipment of FIG. 4 which is driving the parasitic array, such compensation being discussed hereinafter.

In typical TACAN equipment, the beacon transmits about 180 pulse pairs per rotation of the 15 Hz cardioid pattern, and therefore the pulse pairs are rather close together, but really not close enough together to provide a pulse at the exact moment of commutation when the next succeeding parasitic element in the ring is enabled. Moreover, the TACAN system in terms of which the description to date has been couched is only one possible example of the many useful purposes to which the present invention can be put. In some of the other examples as mentioned earlier herein it is desirable to use a much lower pulse rate for the squitter pulses, and in fact during actual tests of the equipment comprising a practical reduction to practice the equipment used very slow squitter pulse rates including only nine pulses per cycle of the 15 Hz cardioid pattern. However, such a slow rate means that the pulses can easily be so far apart in real time that there is a probability that a parasitic element will be newly enabled without any pulse being transmitted at the precise moment of its commutation. If this were to occur, there would be no output from the antenna array to mark the exact moment of sampling, not until sometime approaching the switching-on of the next parasitic element. As a result the effect would be an apparent jittering in the rotation of the cardioid as viewed at the aircraft receiver. It is, therefore, highly desirable to provide means at the precise moment of commutation for insuring the transmission of a pulse pair. In FIG. 4, the wire 25 causes such transmissions at the precise moment of commutation since the wire is coupled to the commutating pulse outputs from the clock means 22. Such an expedient enables the rate of squitter pulse transmission to be slowed down very materially, but despite this reduction in squitter rate, the receiver as shown in FIG. 5 will still provide a satisfactory reconstituted sine wave from its filter 38. This fact is attributable to the sample and hold circuit 36 appearing ahead of the filter 38 which holds a stepped level L until the next one comes along. In the case where a CW signal is being transmitted from the central radiator R, there is no problem concerning the provision of a signal from the antenna array at the very moment of commutation in view of the continuous nature of the transmitted RF signal. In either the CW or the pulsed case, the output on wire 37 should be a stepped DC level resembling the envelope L as shown in FIG. 3. Thus, if some sort of sample and hold circuit 36 is present in the receiver, the transmission of a single pulse pair at each commutation provides a DC level at the output of the sample and hold circuit such that the filter 38 cannot tell the difference between CW, high pulse rate, and low rate radiation. The appearance of a sample and hold feature is common and is not peculiar to the above-mentioned Sierra Research receiver, although it is possible that it may not appear in all airborne TACAN receivers. Construction of the receiver as shown in FIG. 5 is, however, not intentive in the present disclosure.

Turning now to the time at which the Main Reference Burst must be transmitted to compensate for the stepped nature of the signal, in FIG. 3 there is shown the sinusoidal modulation envelope 20 that would be generated by mechanical rotation of a single parasitic element, which sinusoidal modulation is what is normally recovered in TACAN receivers to obtain bearing. This figure also shows the stepped waveform L resulting from the practice of this invention. The basic purpose herein is to use an unmodified air-borne TACAN receiver such as shown in FIG. 5 to accept this stepped modulation and to provide a correct bearing indication. This is readily accomplished after recognizing that the stepped modulation L of FIG. 3 contains a fundamental sinusoidal component 21 similar to that produced by the continuous rotation of a single parasitic antenna, and it is this fundamental component 21 that will be extracted by the filter 38 and used in the bearing determination by measuring the phase between the increasing zero-crossing of this fundamental component 21 as reconstituted in the receiver and the Main Reference Burst pulse as transmitted from the ground beacon. In fact this fundamental component, plus higher order harmonics which are eliminated by the filter 38, add up to produce the stepped modulation in accordance with the Fourier Analysis of complex waveforms. A characteristic feature of this reconstituted fundamental component 21 is that its waveform is phase delayed with respect to the initiation of the steps associated with its transmission by a phase lag of $360°/2n$, where n is the number of comutation steps per cycle. This fundamental component 21 as shown in FIG. 3 has its maximum centered with respect to level L1, which one would expect from knowledge of Fourier Analysis since as noted above the complex stepped waveform has as its chief component this fundamental sine wave. Since this maximum is centered with respect to Level L1, it is thus delayed with respect to the exact moments of stepping associated with the creation of Level L1 by one half the width of a Level, or (360°/2n).

Since the normal TACAN receiver is designed to measure phase between the Reference Burst and a predetermined point on the sine wave output component 21 then it is merely necessary to displace by a fixed delay the moment of transmission of the Reference Burst with respect to the time at which the cardioid being transmitted is stepped when it passes a predetermined orientation.

As mentioned near the beginning of this specification, it is the purpose of a TACAN system to measure the actual phase relation between the Main Reference Burst and a specific point on the fundamental sinusoidal component of the cardioid pattern received at the receiving aircraft. Thus, if in a stepped cardioid system the fundamental sinusoidal component 21 of the reconstituted wave is inherently delayed with respect to the stepping action by one-half of the commutating interval between parasitic elements, this error can be compensated out of the system by delaying the Main Reference Burst at the transmitter by the same amount with respect to that stepping action.

The Main Reference Burst generator MRB, FIG. 4, thus will not be directly triggered by an output of the counter 24, but instead will be triggered by that output delayed by a delay circuit 23 introducing a delay interval equivalent to one half of the commutating period, which in the case of the 15 Hz modulation produced by six parasitic elements would be thirty degrees which amounts to 5.55 milliseconds.

FIG. 6 is similar to the portion of FIG. 3 showing the signal levels L as received, and showing the fundamental sinusoidal component 41 from the filter 38, and showing the timing of these signals with respect to the Main Reference Burst signal B as seen by a receiver located due East of the array of FIG. 2 or 4. If the receiver were located due North of the array, then the Main Reference Burst would occur at the zero-axis crossing instead of the maximum of the sinusoid, which, as is well known in the prior art, is the point on the sinusoid used by the receiver to determine the bearing angle by comparison with the Main Reference Burst which is also known as the North Reference Burst. The received stepped signal L is shown together with the recovered sinusoidal component 41 which has its maximum delayed by 30° or 5.55 milliseconds from the moment when the East parasitic $P_1$ is activated at time T1. The Main Reference Burst B must then be delayed by an amount equal to this 5.55 milliseconds so that it appears in the aircraft receiver at the same time that the recovered component 41 is maximum toward the East, which is the same time at which the component 41 is crossing the zero-axis when viewed from a point due North of the array, assuming that the parasitic element associated with the creation of the maximumm is itself East of the central radiator. If this element is not located due East when the time of transmission must be adjusted accordingly by the amount of the angular displacement of that element with respect to East, to insure that the Main Reference Burst is transmitted when the maximum of the fundamental component is facing East and the zero-axis crossing is oriented North.

In addition to the 15 Hz modulation, TACAN rotating cardioids can also carry 135 Hz modulation. In a mechanical rotating antenna system this modulation is provided by parasitic elements which are spread evenly around in an outer ring slightly over one wavelength in radius as measured from the central radiator and rotated in synchronism with the rotating 15 Hz parasitic element. The effect of these rotated parasitic elements is to produce a 135 Hz ripple modulation on the main 15 Hz modulation produced by the main parasitic element in the inner ring. In order to produce the same result as is obtained by these continuously rotating parasitic elements by the use of commutated parastiic elements, it is necessary to employ at least 27 fixed parasitic elements spread uniformly around the circumference of the inner ring at approximately the same radius, and to sequentially step these parasitics in groups. FIG. 7 of the present drawings shows multiple annular rings of parasitic elements including the three parasitics P1, P2, P3 of the inner ring which serve to provide the 15 cycle rotating cardioid pattern, and including an outer annular ring of 27 parasitic elements generally referred to by the reference characters P11 – P37, inclusive. These are intended to provide the 135 Hz modulation upon the main rotating 15 Hz cardioid provided by the parasitic elements P1 through P3. In order to create this 135 Hz ripple, it is necessary to provide at least three parasitics for each cycle of the 135 Hz modulation, and since there are nine cycles appearing around the 15 Hz cardioid, it therefore, takes at least nine groups of three = 27 parasitic elements to produce the required 35 Hz modulation. FIG. 7 shows an embodiment with this number. In the present system the outer ring comprising the parasitics P11 – P37 is located slightly more than one wavelength out from the central radiator.

FIG. 7 shows a TACAN transmitter T connected to the central radiating element R, and a system of clock means and counters 50 and 54 for commutating the various parasitic elements so that one of them is activated at a time in the inner ring and nine of them at a time are activated in the outer ring. Since each 15 Hz rotation of the antenna pattern is divided into three commutations, there will be 135 Hz pulses per second required to drive a ÷ 9 counter 50 to provide the 15 Hz main rotating cardioid pattern in a TACAN system. There are nine auxiliary sine waves on the main 15 Hz pattern, and therefore, it takes 405 pulses per second to drive a ÷ 3 counter 54 whose outputs are connected to enable the outer parasitic elements nine at a time. In order to keep the main and auxiliary rotating patterns in accurate step, the 135 pulse per second drive for the counter 50 is obtained from the same 405 Hz clock generator 52 which drives the ÷ 3 counter 24, the 135 pulse per second output being obtained from the ÷ 3 circuit 54. The clock 52 also triggers the transmitter T via wire 56 to deliver an output signal at the instant of each commutation. The manner of commutating the parasitic elements using diodes coupling the end of each parasitic element to a counterpoise and using shift registers for turning the diodes "on" as shown in the second and fourth figures of the Himmel patent, supra, is satisfactory and can be used in practical equipment built according to the present invention.

In connection with the use of 135 Hz modulation, attention must be paid to the time at which the Main Reference Burst (MRB) and the Auxiliary Reference Burst (ARB) marker pulses are transmitted with respect to the 15 Hz and 135 Hz modulations and their associated phase delays. This care is necessary since certain airborne TACAN receivers use the ARB's to generate the 135 Hz airborne reference signal and others use the MRB's for both the 15 Hz and 135 Hz reference signals, based on the known relationship that in a conventional TACAN system the MRB and the first ARB always coincide. Because of this, the commutated antenna system must follow the same practice in order to work with both types of air-borne receivers. Now the important thing is that the fundamental sinusoidal 135 Hz component of the stepped system must bear the same effective phase relationship to its ARB's as the fundamental sinusoidal 135 Hz component of the conventional rotating mechanical antenna bears to its ARB's. In the stepped parasitic system, moreover, the ARB timing is fixed with relationship to the MRB timing. The time of transmission of the MRB is determined by the time of commutation of the "East" 15 Hz parasitic element plus the previously-discussed delay determined by the number of 15 Hz parasitics. In order, therefore, to be able to have the fundamental sinusoidal component of the 135 Hz signal occur at the right time with respect to the ARB's whose positions are keyed to the MRB, it is necessary to change the only variable left, i.e. the angular position of the 135 parasitic ring with respect to the 15 Hz parasitic ring must be adjusted by rotation of that ring. In FIG. 7 three parasitics per cycle are used to produce the 15 Hz and 135 Hz modulation, so the phase delay for each cycle is thus $(360/2n) = 60°$, or stated otherwise, the time delay for 15 Hz is 1/6 of 1/15 sec. or 11.1 millisecond. Similarly the time delay for 135 Hz is 1/6 of 1/135 sec., or 1.23 milliseconds. The peak of the fundamental sinusoidal component attributable to the 15 Hz stepped modulation therefore does not occur until 11.1 milliseconds after the enabling of the 15 Hz East parasitic element, and the zero-axis crossing of the 15 Hz sinusoidal pattern crosses the North bearing at the same instant. In a similar manner the zero-axis crossing of the 135 Hz fundamental sinusoidal component of the 135 Hz stepped modulation must also appear to cross the North bearing at the time of the MRB and the first ARB reference bursts, which will occur 1.23 milliseconds after the commutation of one of the parasitic elements in the outer ring. The modulation patterns generated must therefore be as shown in FIG. 8. The relative phasing of the 15 Hz and 135 Hz patterns can be done by adjusting the physical angular location of the 135 Hz parasitics with respect to the 15 Hz parasitics, i.e., slipping the 135 Hz ring of parasitics to position it with respect to the 15th ring of parasitics to provide the phase relationship as shown in FIG. 8. The above example has used a similar number of parasitics for both 135 Hz and 15 Hz modulation. They may, of course, have different numbers of parasitics per cycle.

As shown in FIG. 7 the Main Reference Burst Generator 51, will not be triggered directly by the parasitic East output of the counter 50 but instead will be delayed by a delay circuit 53 introducing a delay equal to one half the commutating period, which in the case of the 15 Hz modulation produced by three parasitics is 60°, which amounts to 11.1 milliseconds. Similalry the ARB generator 59, is also driven through a delay circuit 57 from the East parasitic group output on wire 55 from counter 54 which commutates the 135 modulation ring. The delay is also 60° of 135 Hz or 1.23 ms, since three parasitics per cycle are also used for the 135 modulation. In all cases, the purpose of the adjustment in phases is to make the 15 Hz and the 135 Hz fundamental sinusoidal components go through a North zero-axis crossing simultaneously with the MRB and the first ARB. For the 15 Hz component this occurs when the maximum of the sinusoid faces East, forgetting the 360°/2n delay. In a three parasitic array, this is also true of the 135 Hz component, because each 135 Hz cycle occupies 40° of the whole circle, so that two and one quarter cycles of the 135 Hz modulation occupy 90° of the circle, again forgetting the 360°/2m delay. Therefore, in FIG. 8, if the MRB and the first ARB are placed as shown, the phases are properly adjusted when the East parasitic P1 is commutated 11.1 milliseconds before the MRB/ARB position and the East parasitic P11 is commutated 1.23 milliseconds before that position.

It is interesting to note that the modulation signal for an aircraft located due East, when only three parasitics are used, has only two levels as seen in FIG. 8. This is because one level L10 corresponds to the level caused by the parasitic element P11 which is located due East of the radiating element R, whereas the levels L11 and L12 are caused by the other two parasitics that are symetrically spaced on either side of the East parasitic P11.

In the above noted application, the objective has been to provide a stepped parasitic antenna system for transmitting bearing information to existing unmodified TACAN airborne receivers. To achieve this objective, the cardioid patterns have been stepped at a repetitive 15 Hz rate to permit the filter system in the TACAN receivers to extract the 15 Hz fundamental sinusoidal component for use in the existing phase comparison and bearing measuring circuits. However, the present teaching can also be used in a receiving mode for determining the direction of an incoming signal. A significant application is in connection with air-to-air bearing measurements as discussed in the objects of this disclosure, supra. The inventive concept can be applied to provide bearing information to determine the direction of a signal source whose amplitude remains constant during at least one stepping sequence of the receiving antenna system. A very important application of this capability is in connection with direction finding for station-keeping application as in a system similar to the Sierra Research AN/APN-169 stationkeeping system manufactured under Michnik U.S. Pat. 3,336,591, or for collision avoidance to be used in conjunction with range and range rate measurements made on long-duration transmitted signal bursts as described in my copending patent application, Ser. No. 247,586 (1972), now U.S. Pat. No. 3,801,979, entitled "Integrated Collision Avoidance, DME, Telemetry and Synchronization System." In the latter application it is necessary to determine the direction of arrival of a signal when that signal consists of a signal burst comprising a long pulse or several pulses occurring only once or very infrequently, as in a time-slot system. In order to obtain the direction of such a signal, it is necessary to utilize the fact that in general three or more measurements uniquely define a sinusoid provided the period of that sinusoid is known. It is thus only necessary to make three or more measurements at points in a constant level signal received by a stepped cardioid antenna, and then to suitably process these measurements so they can be used in TACAN-type bearing or direction finding circuitry. In the embodiment discussed below with relation to FIG. 9 a processing system similar to a TACAN receiver system is utilized, although other processing methods such as appropriate mathematical processing in a digital computer could instead be utilized.

The embodiment of FIG. 9 can be used to receive any constant level signal, although in this example it is used to determine the direction of a received non-repetitive pulse group consisting of four pulses arbitrarily spaced 4, 8 and 12 microseconds apart. The transmitter signal intensity is assumed constant during the measurement process. The central receiving antenna element RA is surrounded by four parasitic elements spaced and commutated as previously discussed. The four elements in this example are uniformly spaced around the circumference of a circle for the sake of convenience in extracting a fundamental sinusoidal component by the use of conventional filters, as discussed below, but it should be noted that non-uniform spacing can also be used, although somewhat more complex processing must then be done. As will be noted below, the cardioid pattern need not be uniformly stepped in time, however as was previously done. In the previous illustration the uniform stepping was done for the sake of convenience in processing circuitry, i.e., to use the existing 15 Hz and 135 Hz filters in existing TACAN receivers. In the embodiment of FIG. 9, stepping by uniform time increments is not necessary, but the stepping is done through uniform angular increments to make it easier to extract and process the fundamental sinusoidal component of the step sampled modulation.

The East Parasitic element is assumed to be actuated at the start of the operation. When the first sampled pulse of the four pulse group arrives, it is received by the active element RA and fed to the RF and IF circuits 70 and the Video Detector 71. This detected pulse and the other three successive pulses are also used to step the cardioid receiving antenna pattern by advancing the divide-by-four counter 73. As a result of this stepping of the cardioid by successive pulses, the signal out of the video detector on wire 72, is as shown at the top trace in FIG. 10.

The output of the video detector is fed to a sample and hold circuit 74. The output of the sample and hold circuit on wire 75 is as shown in the second trace in FIG. 10. The signal on wire 75 is fed to a four-position, single pole switch 76 that is also activated by the commutating output of the divide-by-four counter 73. The function of this switch 76 is to feed the four sampled signal levels into four storage devices in box 77 that store the four signal levels indefinitely, as for example, as by analog capacitor means or by suitable A/D conversion and storage means. The four signals stored in signal storage 77 are in turn read out by a four position switch 78 which is, however, controlled by the divide-by-four counter 84 which is in turn driven by a 60 Hz oscillator 79. The net result is a waveform on wire 80 as shown by the third trace in FIG. 10 and appears at the output of the switch 78, and this waveform comprises a continuous sampled signal which when processed in a 15 Hz filter 81 similar to that of a conventional airborne TACAN will convert into a sine wave component on wire 83 which sine wave is shown at the bottom of FIG. 10 and is identical, exclusive of noise, to that which would be generated by continuous 15 Hz rotation of an antenna receiving a constant level signal.

If this sine wave component is now fed to the bearing determining circuits 83 of a conventional TACAN, and this bearing circuit is also fed by a Main Reference Marker Pulse Signal from the unit 86 whose position in time corresponds to the moment when the switch 78 sampled the signal obtained while the East Reference Parasitic P₁ was activated but with this Main Reference Signal being delayed in the delay circuit 85 by 8.3 ms, or 45° of a 15 Hz signal where 45° equals (360/2n) and n = four, then the bearing detecting circuit will provide the direction from which the signal is being received. This 8.3 ms delay corresponds to the delay which the peak of the fundamental component of the stepped antenna envelope experiences with respect to the moment of activation of the East Parasitic, if the stepped antenna system were commutated at a 15 Hz rate for which the processing circuitry, i.e., TACAN bearing circuitry, is designed to operate. In effect, the sampling points defining the envelope associated with the stepped cardioid antenna patten are taken at a nonuniform and arbitrary time rate, but they are taken at uniform angular intervals, of 90° in FIG. 9, and then reproduced at a uniform rate. Therefore as long as the amplitude of the transmitted signal remains constant it doesn't matter when the receiving antenna array is stepped.

A simpler case results when the switches S1 and S2 are thrown to the other position so that the counter 73 is stepped at a 15 Hz rate by output from the divider 84, and the output of the sample and hold circuit 74 goes directly to the 15 Hz filter 81. Since the parasitic elements P1 – P4 are now commutated at a uniform rate, the circuits 76, 77 and 78 are no longer needed to produce the waveforms shown in the lower half of FIG. 10.

The above discussion has outlined various embodiments of the invention whereby an active central element and associated parasitic elements are used to generate stepped patterns, or cardioids with higher order modulation terms superimposed on a basic sinusoidal component which patterns are used in bearing and direction finding applications. The illustrative parasitics have been shown uniformly spaced although this is not necessary, and the parasitics have been shown as stepped both uniformly and non-uniformly time-wise. It should be noted, however, that a cardioid pattern or a cardioid pattern with higher order modulation terms can be generated by the use of methods other than the central radiator and associated parasitic radiators. For example, multiple active radiators fed with proper mutual phases and amplitudes can also be used to generate the desired stepped patterns.

It should also be noted that there is a very important application of this invention for direction finding system in connection with time synchronized stationkeeping systems in which the antenna stepping, signal transmission and reception, and angle processing will be done under control of a master time base in a time ordered or time slotted manner, as in the AN/APN-169, supra.

This invention is not to be limited to the exact forms shown in the drawings for obviously changes may be made within the scope of the following claims.

I claim:

1. A system for determining bearing between a unit transmitting a signal and a signal receiving unit, comprising:
   a. an antenna array at one of said units having a central active antenna element and having a predetermined number of parasitic elements including at least three which are spaced in a ring around the active element, and including commutating means having discrete outputs respectively connected to sequentially activate said parasitic elements to provide the antenna array with a rotary stepped p tern having a fundamental sinusoid component;

b. means for generating a reference marker signal associated with each passing of the fundamental sinusoid of said stepped pattern through a predetermined bearing orientation;

c. means for synchronizing said reference marker generating means and said commutating means and operative to initiate the generation of each reference marker signal to coincide with said passing of the sinusoid component through said orientation;

d. means at the receiver unit responsive to amplitude samples of said transmitted signal corresponding with each commutation and providing therefrom a reconstituted sinusoid representing said fundamental sinusoid of the rotary stepped pattern but delayed by a constant delay which is a function of the number of parasitic elements commutated, and including means for determining said bearing with respect to said predetermined orientation from the phase relationship between a point on said reconstituted sinusoid and the occurrence of said reference marker signal; and e. siad synchronizing means being coupled with a selected one of said discrete outputs which is activated prior to said component passing through said preselected orientation, and said synchronizing means being operative to delay said generation for a fixed interval including an interval compensating for said constant delay.

2. The system as set forth in claim 1, wherein said antenna array has its active element driven by pulse groups from said transmitting unit which includes means to generate said pulse groups, and wherein said parasitic elements are activated by commutating means at said transmitting unit, and said system further including means coupling the commutating means to the transmitting means and operative to actuate its means for generating pulse groups at each moment that a parasitic element is newly commutated.

3. The system as set forth in claim 2, wherein the commutating means comprises counter means having outputs connected respectively to activate said parasitic elements and having clock means connected to step the counter means through repeating cycles at the commutation rate, and the clock means being connected by said coupling means to actuate said means for generating pulse groups synchronized with the steps of the clock means.

4. The system as set forth in claim 1, wherein n parasitic elements are equally spaced and fixed in said ring, said synchronizing means coupled to said selected one of the element activating outputs of the commutating means serving to actuate said reference marker generating means after synchronizing means has delayed the generating of the marker signal by an interval equal to one-half of 360°/n, the delay starting at the instant when the particular parasitic element is activated which immediately precedes the moment when the maximum of the fundamental of the stepped pattern passes through said predetermined orientation and further corrected for the angular displacement from said predetermined orientation of the parasitic element connected to said selected output.

5. The system as set forth in claim 1, wherein the transmitting unit is a TACAN-type unit connected to said antenna array to provide a cardioid pattern stepped to radiate a pattern in space having said fundamental sinusoid component rotating at a 15 Hz rate and said transmitting unit further including means for generating a Main Reference Burst which comprises said means for generating a reference marker signal, said parasitic elements including one element coupled to the particular output of the commutating means which is activated just prior to the moment when the maximum of the fundamental component is oriented East, and said synchronizing means being coupled to said particular output and to said generating means and operative to actuate the latter to generate a Main Reference Burst after a delay interval equal to onehalf of 360°/n, where n is the number of parasitic elements in the ring, said delay being further corrected for the angular displacement from East orientation of said one parasitic element.

6. The system as set forth in claim 5, wherein said antenna array includes a second ring of parasitic elements spaced around said active antenna element and including nine similar groups of at least three parasitic elements each, second commutating means having outputs coupled to corresponding parasitic elements in each group to activate said corresponding elements to provide nine fundamental sinusoidal components of 135 Hz modulation on the 15 Hz sinusoid pattern, and said transmitting unit having means for generating nine Auxiliary Reference Bursts per rotation of the 15 Hz pattern, one of the Auxiliary Reference Bursts coinciding with said Main Reference Burst, and the second ring of parasitic elements being annularly displaced for orientation with respect to the first-mentioned ring such that one of the 135 Hz sinusoidal components has a zero-axis crossing in the increasing direction which occurs coincidently with said one of the Auxiliary Reference Bursts.

7. The system as set forth in claim 1, wherein the transmitting unit is a TACAN-type unit connected to said antenna array to provide a cardioid pattern stepped to rotate at a 15 Hz rate and said transmitting unit further including means for generating a Main Reference Burst which comprises said means for generating a reference marker signal, one of said parasitic elements being oriented East of said active antenna element and being connected to a particular activating output of the commutating means, and said synchronizing means being coupled between that particular output and said generating means to activate the latter to generate said Main Reference Burst after the moment when that particular output is activated and delayed therebeyond by one-half of 360°/n where n is the number of parasitic elements in the ring.

8. The system as set forth in claim 7, wherein said antenna array includes a second ring of parasitic elements spaced around said active antenna element and including nine similar groups of at least three parasitic elements each, second commutating means having outputs coupled to corresponding parasitic elements in each group to activate said corresponding elements to provide nine fundamental sinusoidal components of 135 Hz modulation on the 15 Hz sinusoid pattern, and said transmitting unit having means for generating nine Auxiliary Reference Bursts per rotation of the 15 Hz pattern, one of the Auxiliary Reference Bursts coinciding with said Main Reference Burst, and the second ring of parasitic elements being annularly displaced for orientation with respect to the first mentioned ring such that corresponding one of the parasitic elements in each group is coupled to one output of the second commutating means and commutated thereby at a time earlier than said coincident Auxiliary Reference Bursts by one-half of 360°/$m$, where $m$ is the total number of parasitic elements in said second ring.

9. The system as set forth in claim 1, wherein the antenna array has its active element connected to the receiving unit to provide said amplitude samples of a transmitted signal, and wherein said parasitic elements are activated by said commutating means which is located at the receiving unit and provides a rotary stepped receiving-antenna pattern.

10. The system as set forth in claim 9, wherein the commutating means comprises counter means having outputs connected respectively to activate said parasitic elements and having clock means connected to step the counter means through repeating cycles at the commutation rate, one of the counter outputs which is connected to activate a parasitic element being coupled through said synchronizing means to said reference marker generating means to actuate the latter at an instant determined by said synchronizing means and corrected by the angular displacement from said predetermined bearing orientation of the parasitic element.

11. The system as set forth in claim 9, wherein said transmitted signals comprise pulse signals which occur at a first repetition rate and are received at the active element of the antenna array and detected, first commutating means coupled to be stepped through a repeating cycle in response to detected pulses, the receiving unit including amplitude sampling means operative to sample the amplitude of each detected pulse; storage means having separate amplitude storage capability corresponding with each parasitic element and said commutating means being coupled to actuate the storage means to store the pulse amplitudes sampled as a result of each commutation; a second commutating means comprising counter means having outputs actuated at a uniform second rate to retrieve from said storage means continuous cyclic trains of pulse amplitude samples and to couple them to said amplitude responsive means at the receiver unit for providing a reconstituted sinusoid fundamental, one of said counter outputs being coupled through said synchronizing means to actuate after a delay said means for generating said reference marker signal.

* * * * *